(12) United States Patent
Lander et al.

(10) Patent No.: US 10,307,973 B2
(45) Date of Patent: Jun. 4, 2019

(54) METHOD OF MANUFACTURING A COMPOSITE COMPONENT

(71) Applicant: ROLLS-ROYCE plc, London (GB)

(72) Inventors: James K Lander, Bristol (GB); Peter Calvert, Bristol (GB); James Bowyer, Derby (GB); Michael Bowyer, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 15/574,914

(22) PCT Filed: Jun. 2, 2016

(86) PCT No.: PCT/EP2016/062482
§ 371 (c)(1),
(2) Date: Nov. 17, 2017

(87) PCT Pub. No.: WO2016/198308
PCT Pub. Date: Dec. 15, 2016

(65) Prior Publication Data
US 2018/0162071 A1 Jun. 14, 2018

(30) Foreign Application Priority Data
Jun. 12, 2015 (GB) .................................. 1510247.8

(51) Int. Cl.
*B32B 41/00* (2006.01)
*B29C 70/24* (2006.01)
(Continued)

(52) U.S. Cl.
CPC .............. *B29C 70/24* (2013.01); *B29C 70/54* (2013.01); *B29L 2031/082* (2013.01)

(58) Field of Classification Search
CPC ... B29C 70/24; B29C 70/54; B29L 2031/082; B32B 5/02; B29B 11/16
(Continued)

(56) References Cited

U.S. PATENT DOCUMENTS

| | | | |
|---|---|---|---|
| 5,186,776 A | 2/1993 | Boyce et al. | |
| 8,205,654 B2 * | 6/2012 | Choi | B29C 66/001 156/289 |

(Continued)

FOREIGN PATENT DOCUMENTS

| | | |
|---|---|---|
| DE | 25 28 277 A1 | 1/1977 |
| EP | 1213383 A2 | 6/2002 |

(Continued)

OTHER PUBLICATIONS

Sep. 16, 2016 International Search Report issued in International Patent Application No. PCT/EP2016/062482.
Sep. 16, 2016 Written Opinion issued in International Patent Application No. PCT/EP2016/062482.
Dec. 9, 2015 Search Report issued in British Patent Application No. GB1510247.8.

*Primary Examiner* — Michael N Orlando
*Assistant Examiner* — Joshel Rivera
(74) *Attorney, Agent, or Firm* — Oliff PLC

(57) ABSTRACT

A method of reinforcing a fiber reinforced resin matrix composite structure, the method including: providing a composite structure having one or more holes formed therein, and feeding a reinforcement rod through a passageway having one or more walls defining an inlet to the passageway. The inlet to the passageway is dimensioned to prevent a rod having a maximum cross sectional dimension greater than a predetermined dimension from passing through the passageway. In the event of the rod impacting the wall defining the inlet to the passageway, operation of the rig is stopped. In the event of the rod passing through the (Continued)

passageway without impacting the wall defining the inlet to the passageway, a portion of the rod is inserted into a hole in a composite structure.

18 Claims, 7 Drawing Sheets

(51) Int. Cl.
*B29C 70/54* (2006.01)
*B29L 31/08* (2006.01)

(58) Field of Classification Search
USPC .......................... 156/64, 350, 351, 378, 379
See application file for complete search history.

(56) References Cited

U.S. PATENT DOCUMENTS

| | | |
|---|---|---|
| 8,893,367 B2 | 11/2014 | Lander |
| 2005/0006023 A1 | 1/2005 | Johnson et al. |
| 2012/0231202 A1* | 9/2012 | Takemura ................. B32B 3/24 |
| | | 428/63 |
| 2013/0089702 A1 | 4/2013 | Lander |

FOREIGN PATENT DOCUMENTS

| | | |
|---|---|---|
| EP | 2581201 A1 | 4/2013 |
| GB | 1 554 329 A | 10/1979 |
| WO | 00/26012 A1 | 5/2000 |

* cited by examiner

METHOD OF MANUFACTURING A COMPOSITE COMPONENT

TECHNICAL FIELD

The present disclosure concerns a method of reinforcing a composite structure, a method of manufacturing a composite component, and/or a rig for reinforcing a composite structure.

BACKGROUND

Gas turbine engines are typically employed to power aircraft. Typically a gas turbine engine will comprise an axial fan driven by an engine core. The engine core is generally made up of one or more turbines which drive respective compressors via coaxial shafts. The fan is usually driven via one of the turbines.

The fan may comprise an array of radially extending fan blades mounted on a rotor. The fan blades may be manufactured from metallic or composite materials. Generally composite fan blades include a body formed from a plurality of composite structured plies that include fibres within a resin matrix.

During operation of the gas turbine engine, the fan blades may be impacted by a foreign object (such as a bird) or if a failure occurs the fan blade may be impacted by another fan blade that has been released from the remainder of the fan. In such impact events the integrity of the fan blade should be maintained. A failure mechanism of concern for composite fan blades is delamination.

To resist delamination the fan blade may be reinforced. One method of reinforcing a composite component such as a fan blade is to use through thickness reinforcement rods or pins.

U.S. Pat. No. 8,893,367, which is incorporated herein by reference, discloses a method by which reinforcement rods can be positioned in a composite component. In the method described in U.S. Pat. No. 8,893,367, a composite material is heated and holes are formed in the material, reinforcement elements are then provided in each of the holes.

SUMMARY OF DISCLOSURE

The present disclosure is concerned with further developing and enhancing the method described in U.S. Pat. No. 8,893,367.

In a first aspect there is provided a method of reinforcing a composite structure. The method comprises providing a composite structure having one or more holes formed therein. A reinforcement rod is fed through a passageway having one or more walls defining an inlet to the passageway. The inlet to the passageway is dimensioned to prevent a rod having a maximum cross sectional dimension greater than a predetermined dimension from passing through the passageway. In the event of the rod contacting (e.g. impacting) the wall defining the inlet to the passageway, the method is stopped and an oversized or damaged section of the rod is removed. In the event of the rod passing through the passageway without contacting (e.g. impacting) the wall defining the inlet to the passageway, a portion of the rod is inserted into a hole in a composite structure.

During the process of manufacturing the reinforcement rod, the rod may break and it may be necessary to splice two sections of rod together. If a spliced portion of rod is positioned in a composite structure it will have different properties to a non-spliced portion of rod. Accordingly, it is undesirable to have a spliced portion of rod in a composite structure because the properties of the final composite component may vary to a greater extent than is desirable. Furthermore, there is a concern that a splice may act as a damage initiation site. The wall of the inlet of the passageway used in the first aspect can be dimensioned so as to detect a spliced portion of a rod (e.g. may be considered to form part of a splice detection unit). Additionally, or alternatively, the passageway may be used to ensure that the dimensions of the rod (e.g. diameter of the rod) are below a predetermined maximum.

The passageway may be defined by a tube. In such an example, the walls of the tube may define the inlet to the passageway. An inner surface of the tube may define the dimensions of the passageway. The inner diameter of the tube may be equal to a predetermined maximum cross sectional dimension of the rod. The tube may have a constant inner diameter or alternatively the inner diameter may vary. The tube may be cylindrical or have a cylindrical bore, or may be any other suitable shape.

The tube may be slidably mounted, for example to a rig. When the tube is impacted by a rod, the tube may slide. The method may comprise detecting sliding of the tube. A motion sensor may be provided to detect movement of the tube. Alternatively, a switch may be provided and arranged such that movement of the tube impacts the switch. The switch or motion sensor may be connected to a control system and be arranged to send a signal to said control system indicating when movement of the tube is detected. The control system may be configured to stop the method when the tube moves (e.g. to shut down a rig used to perform the method).

The cross sectional shape of the passageway may be substantially the same as the intended cross sectional shape of the rod. For example, when the passageway is defined by a tube, the cross sectional shape of a cylindrical bore of the tube and optionally the cross sectional shape of the entire tube may be selected to match the cross-sectional shape of the rod The method may comprise dispensing rod from a reel to the passageway.

The method may include monitoring a tension in the rod dispensed from a reel between the reel and the passageway. The method may be stopped if the tension drops below a predetermined level.

The method may comprise feeding a plurality of reinforcement rods through a plurality of passageways, each passageway having one or more walls defining an inlet to the passageway. The inlet to each passageway may be dimensioned to prevent a rod having a maximum cross sectional dimension greater than a predetermined dimension from passing through each passageway. In the event of at least one rod impacting one of the walls defining the inlet to the passageway, the method may be stopped and an oversized or damaged section of one or more rods removed. In the event of the rods passing through the passageways without impacting a wall defining at least one of the inlets to the passageway, a portion of each rod is inserted into a hole in a composite structure. In such an example, the composite structure has a plurality of holes formed therein.

The method may further comprise heating a composite structure to a predetermined temperature and forming one or more holes in the composite structure. The composite structure may be heated to a pre-determined temperature over and/or for a pre-determined time period, the pre-determined temperature and time period being selected such that the gel point of the composite structure is not reached. The composite structure may be heated to a temperature greater than room temperature. The temperature may be selected so as to ease formation of holes in the composite structure.

The one or more holes may be formed by inserting a needle or piercing member into the composite structure. The needle may have a conical shaped tip. The needle may be rotated during insertion into the composite structure.

The composite structure may be a polymeric matrix material. The composite structure may comprise a fibre reinforced resin matrix. The composite structure may be a composite laminated structure.

The rod may be made from any suitable reinforcement material, for example carbon, glass, metallic materials, ceramic materials, plastic materials or a composite arrangement of such materials.

The method may comprise cropping the reinforcement rod to a desired length. The reinforcement rod may be cropped to a desired length when the rod is positioned in a hole of the composite structure. The reinforcement rod may be cropped using a shearing mechanism, e.g. by impacting the rod with a plate having a tapered portion.

The method may comprise cropping the reinforcement rod at a position spaced from the surface of the composite structure and tamping the cropped reinforcement rod into the hole of the composite structure such that the cropped rod is flush with the surface of the composite structure.

The passageway may be positioned closer to the point of insertion of a portion of the rod into the composite structure than to the reel from which the rod is dispensed. In this way, if a section of the rod needs to be removed, re-feeding or re-threading of the rod to the point of insertion can be eased.

In a second aspect there is provided a rig for reinforcing a composite structure. The rig comprises a rod insertion device for inserting a reinforcement rod into a hole formed in a composite structure. The rig also includes a verification unit (or a splice detection unit). The verification unit (or splice detection unit) includes a passageway and one or more walls defining an inlet to the passageway. The inlet to the passageway is dimensioned to prevent a rod having a maximum cross sectional dimension greater than a predetermined dimension from passing through the passageway. A control system is provided and configured to stop the rig in the event of a rod impacting the wall defining the inlet to the passageway.

The rig may be used in the method of the first aspect. The rig may have one or more of the optional features of the first aspect.

The rig may comprise a rod supply system including a reel from which rod can be dispensed.

The verification unit may be positioned closer to the rod insertion device than to the rod supply system.

In a third aspect there is provided a method of manufacturing a fibre reinforced resin matrix composite component including reinforcing a composite structure using the method according to the first aspect.

The composite component may be a fan blade or a casing for a gas turbine engine.

The skilled person will appreciate that except where mutually exclusive, a feature described in relation to any one of the above aspects of the invention may be applied mutatis mutandis to any other aspect of the invention.

DESCRIPTION OF THE DRAWINGS

Embodiments of the invention will now be described by way of example only, with reference to the Figures, in which.

DETAILED DESCRIPTION

Figure 1:
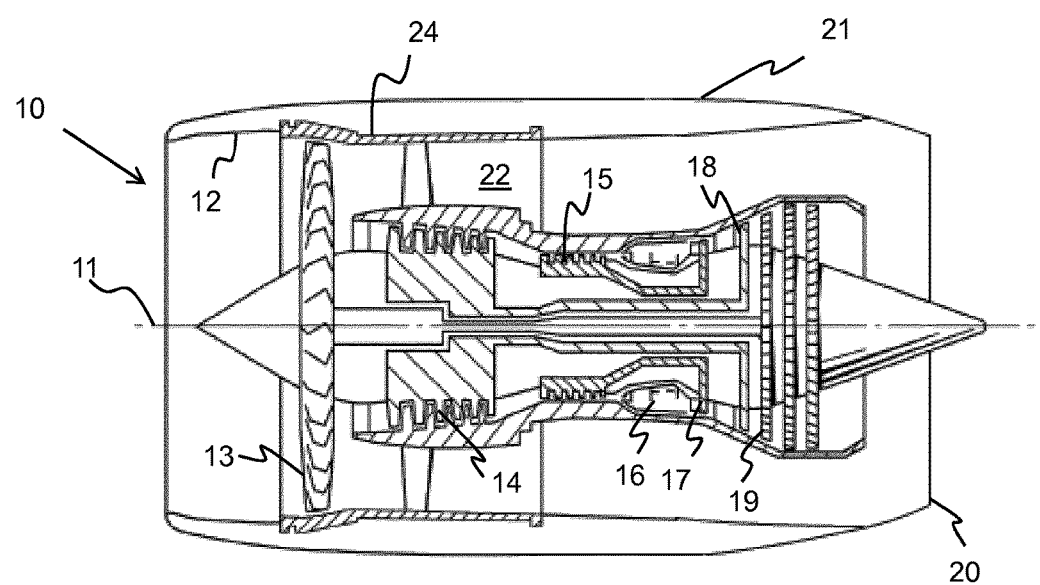
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

The fan blades of the fan 14 and/or the casing 24 surrounding the fan may be made from a composite material, for example, plies of a fibre reinforced resin matrix. To improve structural integrity and resist delamination the fan blades and/or casing may need to be reinforced in a direction tangential to plies of a composite structure defining the fan blades or casing. One method of reinforcing a composite component is to pin the component.

Figure 2:
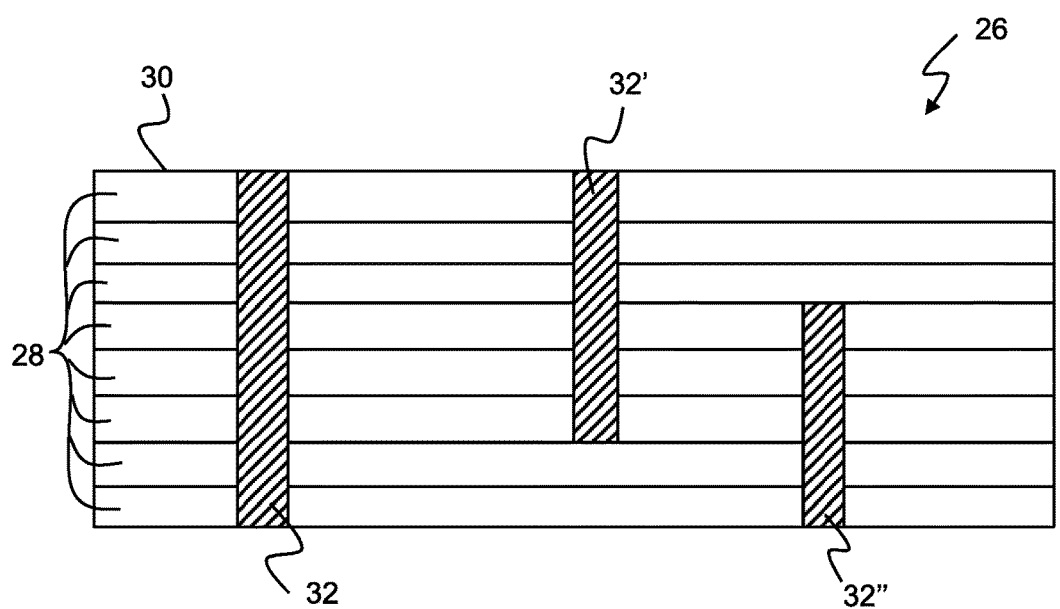
FIG. 2 is a schematic cross section through a composite component reinforced with pins.

A composite component is indicated generally at 26 in FIG. 2. The composite component 26 includes a plurality of plies 28 stacked to define a laminated structure 30. The composite component is reinforced by rods or pins 32, 32' and 32". The pins extend through the composite component in a direction perpendicular to the direction of the plies. As illustrated in FIG. 2, a pin 32 can extend through the entire thickness of the component, or a pin 32', 32" can extend through part of the thickness of the component and the pins may be arranged on the same side or on opposite sides of the component.

A method of forming a component similar to the component 26 will now be described in more detail.

Figure 3:
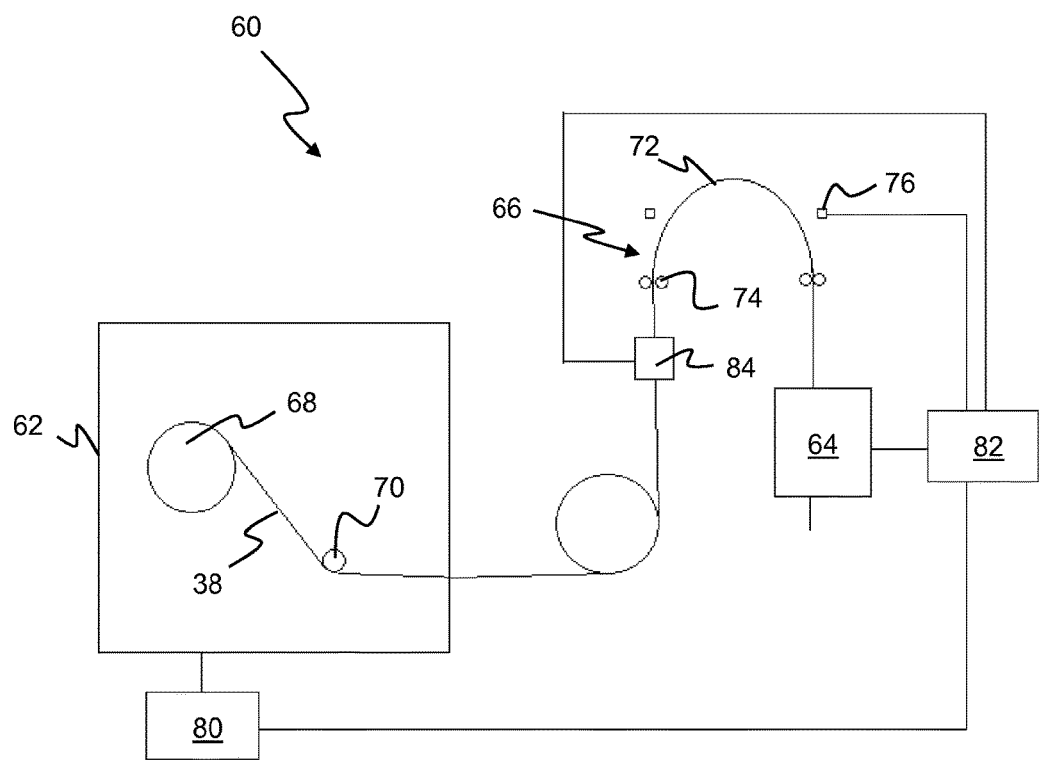
FIG. 3 is a schematic of a rig including a rod supply system, a rod insertion device and a verification unit.

Referring now to FIG. 3, a rig for use in reinforcing a composite structure is indicated generally at 60. The rig includes a rod insertion device 64, a rod supply system 62 for supplying rod 38 to the insertion device 64, a tension removal arrangement 66 for removing tension from the rod 38 between the supply system 62 and the rod insertion device 64, and a verification unit 84 (which may also be referred to as a splice detection unit).

The rod insertion device 64 and the method of operation of the rod insertion device will now be described in more detail with reference to FIGS. 4 to 6. In the present example the rod insertion device forms holes in the composite structure, but alternatively the composite structure may be provided with holes formed therein.

In the present example, the composite structure is a laminated structure and is formed by laying plies on top of each other. The method of forming a composite structure is well understood in the art, so will not be described in detail here, but may include laying the plies by hand or forming a ply using tape that may be laid using an automated fibre placement machine.

In the present example, the composite structure is heated to a pre-determined temperature for a pre-determined length of time. The pre-determined temperature and length of time is dependent upon the matrix material of the composite structure, and is selected such that the gel point of the matrix material is not reached so as to avoid curing the composite structure. The gel point can be defined as the start of the cure reaction for the matrix material, i.e. the point at which the molecules of the matrix material begin linking together (or gelling) and the material starts to harden.

The temperature the composite structure is heated to is selected so as to soften the material of the composite structure. Once the material is softened one or more holes are formed in the composite structure. Referring to FIG. 4, the rod insertion device is provided with a needle 34. A hole 36 is formed in the composite structure 30 using the needle 34. The needle 34 includes a conical end to ease initial formation of the hole. The needle 34 may be rotated during formation of the hole. The method of heating the composite structure and forming a hole in said composite structure is explained in detail in U.S. Pat. No. 8,893,367 incorporated herein by reference, for example the method is described in detail in paragraphs [0050] to [0064] of EP2581201A1 (corresponding to U.S. Pat. No. 8,893,367).

Figure 5:
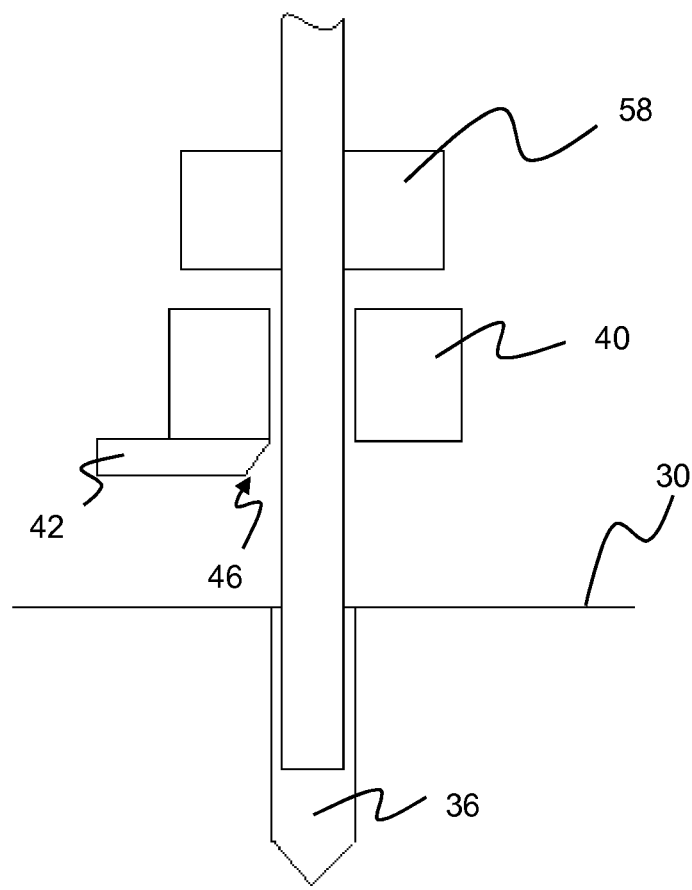
FIG. 5 is a schematic cross section of a portion of the rod insertion device of FIG. 3 positioning a rod in a hole of a composite structure.

Once a hole 36 is formed in the composite structure 30 a reinforcement rod is inserted into the hole using the arrangement illustrated in FIG. 5. As illustrated in FIG. 5, the insertion device of the rig includes a gripper 58 for gripping the rod 38 and pulling and directing the rod into the hole 36. A guide 40, e.g. in the form of a tube, is provided to support and further direct the rod into the hole. Once a desired length of rod is positioned in the hole 36 the rod is cropped. In the present example, the rod is made from fibrous carbon and is cut using a shearing mechanism, but in alternative embodiments the rod may be cut using alternative cutting mechanisms. The insertion device includes a cropper in the form of a plate 42 that has a tapered portion 46. The plate 42 is operable to slide relative to the guide 40 and impact the rod 38 so as to initiate shear.

Figure 6:
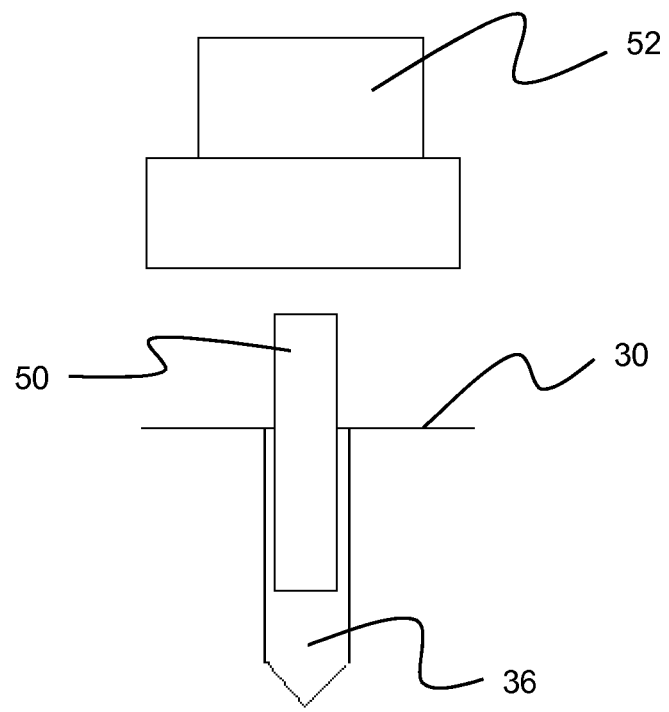
FIG. 6 is a schematic cross section of a foot for pushing a cropped rod into a hole of a composite structure.

Referring now to FIG. 6, once a cropped rod 50 of a desired length is positioned in the hole 36, the rod 50 is pushed so as to be flush with a surface of the composite structure 30, or to protrude a desired amount from the surface of the structure 30. The insertion device is provided with a foot 52 operable to push the cropped rod 50 into the hole 36 of the composite structure.

Figure 4:
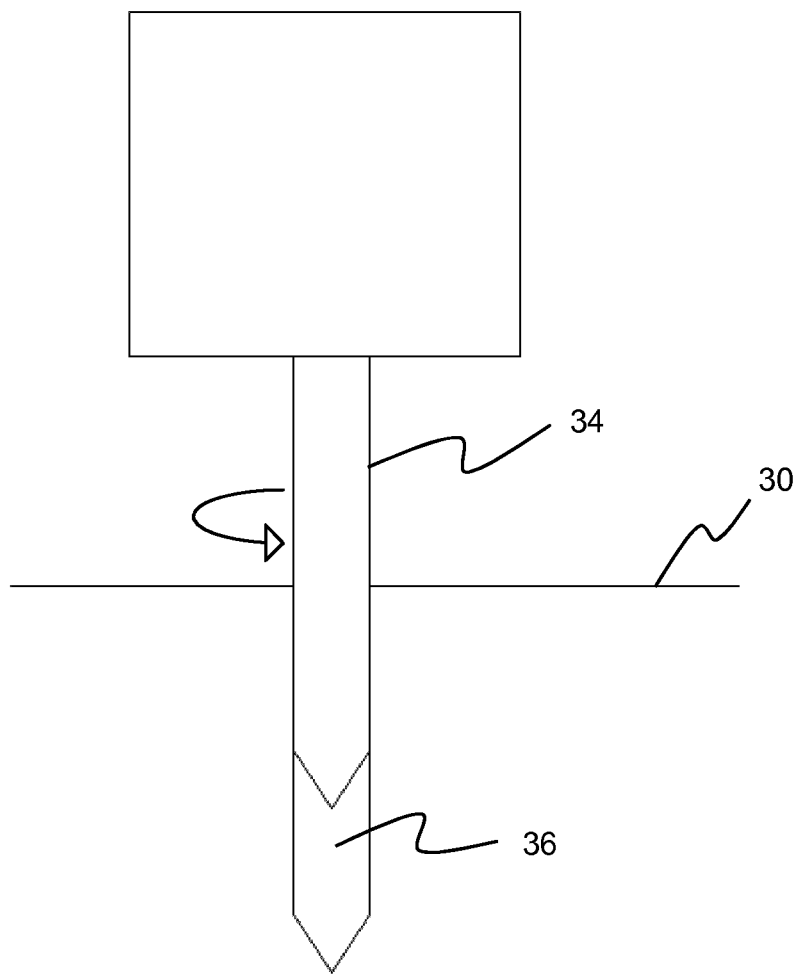
FIG. 4 is a schematic cross section of a needle of a rod insertion device of the rig of FIG. 3 forming a hole in a composite structure.

FIGS. 4 to 6 illustrate insertion of a single rod into a single hole. However, as will be appreciated by the person skilled in the art the described components of the insertion device can be modified or provided in a plurality so that a plurality of rods can be inserted into a plurality of holes in a composite structure at one time.

Referring back to FIG. 3, the rod supply system will be explained in more detail. In the supply system shown in FIG. 3 one reel 68 is shown, but any number of reels may be provided depending on the number of rods to be inserted by the insertion device 64 at any one time. The reinforcement rod 38 is provided on a reel 68. The reel 68 is arranged to rotate so as to release the rod from the reel. A roller 70 associated with the reel is provided to guide the rod 38. In the present example only one roller 70 per reel is shown, but in alternative embodiments any number of rollers may be provided. A motor may be provided to drive the reels in a direction so as to tension the rod in the rod supply system.

A tension detection device 80 may be provided. The tension detection device monitors a tension in the rod whilst the rod is in the supply system 62. If the tension in any one of the rods drops below a predetermined tension, the detection device sends a signal to a rig control system 82 to temporarily stop insertion of the rod into the composite structure. In this way, faults in the supply system can be detected and addressed.

To improve the flow of rod from the rod supply system 62 to the rod insertion device 64, a tension removal arrangement is provided. The tension removal arrangement may be configured to form a loop 72 of rod that is unsupported and substantially free from tension. Rod 38 is fed from the supply system 62 to the loop. When the gripper of the insertion device 64 pulls the rod to direct a portion of the rod into a hole of a composite structure, the gripper pulls rod that is substantially free from tension from the loop 72. In this way, the gripper does not "see" the rod tension of the supply system.

Sensors 66, in this example lasers (or light gates), are provided to monitor the position of the rod in the loop 72. When the material in the loop drops below a predefined position more rod is fed into the loop.

A verification unit 84 is provided to ensure that the rod is of the correct dimensions and/or does not contain any faults. For example, a fault that may be present in a rod in the form of a spliced region. During manufacture of the rod, the rod may split. To fix this defect, two parts of the rod may be joined together using a splice. However, a spliced region of the rod is likely to have different properties to a non-spliced region of the rod and may act as a crack initiator, as such it is preferable not to include a spliced region in the composite component.

Figure 7A:
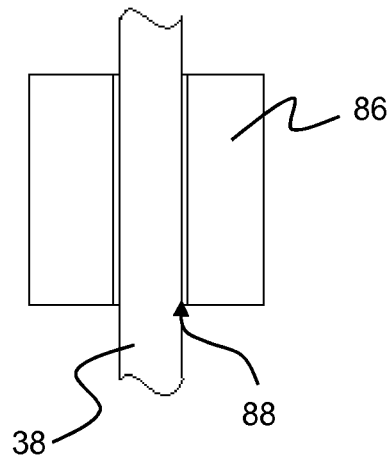
FIG. 7A is a schematic of a passageway of the verification unit of FIG. 3 showing a non-spliced portion of rod passing through the passageway.
Figure 7B:
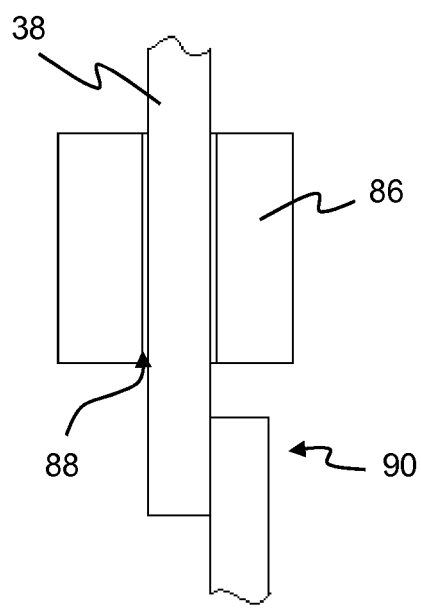
FIG. 7B is a schematic of a passageway of the verification unit of FIG. 3 showing a spliced portion of rod being prevented from passing through the passageway.

Referring now to FIG. 3 and FIGS. 7A and 7B, the verification unit includes a tube 86 defining a passageway 88. In the present example, the passageway has the same cross sectional shape as the rod 38, which in this case is circular. As can be seen in FIG. 7A, if the rod has a diameter less than the diameter of the passageway, the rod will travel through the passageway 88 unhindered. However, as can be seen in FIG. 7B, if the rod has a diameter greater than the diameter of the passageway or includes a splice, the rod will be prevented from travelling through the passageway 88 by the walls of the tube 86.

With reference to FIG. 3, the verification unit 84 includes a sensor that detects when the rod 38 is prevented from moving through the passageway 88 by the tube 86. In the present example, the tube 86 is slideably mounted to the rig, such that a splice will contact the walls of the tube and cause the tube to slide in the direction of travel of the rod. The tube then contacts a sensor or switch to indicate that a splice has been detected. Once a splice (or change in thickness) has been detected, a signal is sent to the control system 80 which shuts down the rod supply system and the rod insertion device.

The sensor of the verification unit may be any suitable type of sensor, for example a motion sensor or trigger that detects movement of the passageway caused by contact with the passing rod. In other examples of the rig, the tension detection device 80 may be used to identify a variation in response of the supply system to indicate a possible defect in the rod. For example, the tube 86 may prevent the rod from being fed to the insertion device. In such an event, the tension detection device 80 detects that the or one of the spools of rod isn't turning, e.g. there is no demand for that rod to be supplied to the insertion device and assumes a blockage due to a splice.

In use, when the rig 60 is shut down due to a detected fault in the rod 38 an operator can investigate the error and take corrective action. For example, the operator may remove rod from the rig that is in and between the verification unit and the rod insertion device and also remove the section of rod that is defective. The operator may then thread the non-defective rod through the system to the rod insertion device. To facilitate this procedure, the verification unit is positioned near to the rod insertion device so as to minimise the amount of "rethreading" of the rod an operator is required to do when a defect is detected.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, the composite component has been described with reference to a fan blade and/or a fan case of a gas turbine engine, but it will be understood that the method described herein is applicable to any composite component that is reinforced using reinforcing rods.

In the described example the passageway of the verification unit is defined by a tube, but in alternative embodiments the passageway may be defined by one or more alternatively shaped components. In further examples, non-contact methodologies may be used to detect a change in dimension of the rod. Further, in the present example the diameter of the passageway is constant along the length of the tube, but in alternative examples the diameter may vary, provided that the diameter of the inlet is set to the required maximum allowable rod diameter.

The invention claimed is:

1. A method of reinforcing a fibre reinforced resin matrix composite structure, the method comprising:
   providing a composite structure having one or more holes formed therein,
   feeding a reinforcement rod through a passageway having one or more walls defining an inlet to the passageway, wherein the inlet to the passageway is dimensioned to prevent a rod having a maximum cross sectional dimension greater than a predetermined dimension from passing through the passageway,
   stopping the feeding of the reinforcement rod through the passageway when the reinforcement rod contacts the wall that defines the inlet to the passageway, and
   inserting a portion of the reinforcement rod into a hole of the composite structure after the reinforcement rod passes through the passageway without contacting the wall that defines the inlet to the passageway.

2. The method according to claim 1,
   wherein a rig may be provided for feeding the reinforcement rod through the passageway and for inserting the reinforcement rod into the hole of the composite structure, and
   wherein the wall defining the inlet to the passageway is configured such that said wall may be impacted by the reinforcement rod and in the event of the reinforcement rod impacting the wall defining the inlet to the passageway, the method comprises stopping operation of the rig.

3. The method according to claim 2, wherein the passageway is defined by a tube, and wherein the inner diameter of the tube is equal to a predetermined maximum cross sectional dimension of the reinforcement rod.

4. The method according to claim 3, wherein the tube is arranged to slide when impacted by the reinforcement rod and the method comprises detecting a sliding motion and stopping operation of the rig when said sliding motion is detected.

5. The method according to claim 4, wherein a switch or motion detector is provided to detect sliding of the tube, and wherein said switch or motion detector is configured to send a signal to a control system to stop operation of the rig.

6. The method according to claim 1, wherein the cross sectional shape of the passageway is substantially the same as an intended cross sectional shape of the rod.

7. The method according to claim 1, comprising dispensing the reinforcement rod from a reel to the passageway.

8. The method according to claim 7, wherein the passageway is positioned closer to a point of insertion of a portion of the reinforcement rod into the composite structure than to the reel from which the reinforcement rod is dispensed.

9. A rig for reinforcing a fibre reinforced resin matrix composite structure, the rig comprising:
   a rod insertion device for inserting a reinforcement rod into a hole formed in a composite structure; and
   a verification unit including:
   a passageway and one or more walls defining an inlet to the passageway, wherein the inlet to the passageway is dimensioned to prevent a rod having a maximum cross sectional dimension greater than a predetermined dimension from passing through the passageway, and
   a control system configured to stop the rig in the event of the reinforcement rod impacting the wall defining the inlet to the passageway.

10. The rig according to claim 9, wherein the passageway is defined by a tube.

11. The rig according to claim 10, wherein the inner diameter of the tube is equal to a predetermined maximum cross sectional dimension of the reinforcement rod.

12. The rig according to claim 9, wherein the cross sectional shape of the passageway is substantially the same as an intended cross sectional shape of the reinforcement rod.

13. The rig according to claim 9, comprising a rod supply system including a reel from which the reinforcement rod can be dispensed.

14. The rig according to claim 13, wherein the verification unit is positioned closer to the rod insertion device than to the rod supply system.

15. A method according to claim 1 performed using a rig for reinforcing a fibre reinforced resin matrix composite structure, the rig comprising:
   a rod insertion device for inserting the reinforcement rod into the hole formed in the composite structure; and
   a verification unit including:
   the passageway and the one or more walls defining the inlet to the passageway, wherein the inlet to the passageway is dimensioned to prevent the rod having the maximum cross sectional dimension greater than the predetermined dimension from passing through the passageway, and
   a control system configured to stop the rig in the event of the reinforcement rod impacting the wall defining the inlet to the passageway.

16. A method of manufacturing a fibre reinforced resin matrix composite component including reinforcing the composite structure using the method according to claim 1.

17. The method according to claim 16, wherein the composite component is a fan blade for a gas turbine engine.

18. The method according to claim 1, wherein a verification unit of a rig includes the passageway and the inlet to the passageway.

* * * * *